United States Patent
Engels

(10) Patent No.: US 6,915,582 B1
(45) Date of Patent: Jul. 12, 2005

(54) ALIGNMENT STRUCTURE

(75) Inventor: Geoffrey P. Engels, Warner Robins, GA (US)

(73) Assignee: ARINC Incorporated, Annapolis, MD (US)

( * ) Notice: Subject to any disclaimer, the term of this patent is extended or adjusted under 35 U.S.C. 154(b) by 0 days.

(21) Appl. No.: 10/781,829

(22) Filed: Feb. 20, 2004

(51) Int. Cl.⁷ ............................................. G01B 5/25
(52) U.S. Cl. .................... 33/286; 33/645; 33/DIG. 21; 33/227; 33/293; 356/152.1; 356/153
(58) Field of Search ..................... 33/286, 645, 412, 33/529, DIG. 21, 227–228, 293; 356/152.1, 152.2, 153

(56) References Cited

U.S. PATENT DOCUMENTS

| | | | |
|---|---|---|---|
| 4,624,563 A | | 11/1986 | Johnson |
| 4,709,485 A | * | 12/1987 | Bowman ..................... 33/228 |
| 4,712,953 A | | 12/1987 | Witzel et al. |
| 4,764,010 A | | 8/1988 | Bachmann et al. |
| 4,867,560 A | | 9/1989 | Kunitsugu |
| 4,882,772 A | | 11/1989 | Rist et al. |
| 4,928,401 A | | 5/1990 | Murray, Jr. |
| 4,977,516 A | | 12/1990 | Shepard |
| 4,981,354 A | | 1/1991 | DeHainaut et al. |
| 4,984,173 A | | 1/1991 | Imam et al. |
| 4,999,506 A | | 3/1991 | Mizusawa et al. |
| 5,077,905 A | | 1/1992 | Murray, Jr. |
| 5,115,406 A | | 5/1992 | Zatezalo et al. |
| 5,148,232 A | | 9/1992 | Duey et al. |
| 5,244,052 A | | 9/1993 | Yamaguchi |
| 5,430,539 A | | 7/1995 | Lysen |
| 5,435,073 A | * | 7/1995 | Sullivan ....................... 33/661 |
| 5,450,245 A | | 9/1995 | Grotzinger et al. |
| 5,684,578 A | | 11/1997 | Nower et al. |
| 5,715,609 A | | 2/1998 | Nower |
| 5,877,854 A | | 3/1999 | Shai et al. |
| 5,980,094 A | * | 11/1999 | Nower ....................... 33/645 |
| 6,031,613 A | | 2/2000 | Washington |
| 6,034,763 A | | 3/2000 | Slater et al. |
| 6,046,799 A | | 4/2000 | Lysen |
| 6,049,378 A | | 4/2000 | Busch et al. |
| 6,049,379 A | | 4/2000 | Lucas |
| 6,411,375 B1 | * | 6/2002 | Hinkle et al. ............. 356/152.1 |

* cited by examiner

*Primary Examiner*—Christopher W. Fulton
*Assistant Examiner*—Yaritza Guadalupe
(74) *Attorney, Agent, or Firm*—Oliff & Berridge, PLC

(57) ABSTRACT

The alignment of two pieces of machinery is achieved so that centerlines of rotating shafts of each piece are in-line. The methods and systems include a) rotating a shaft on a first unit, the first unit including a laser holder assembly for projecting a light source in a circle around a centerline of the first shaft, b) projecting the light source from the laser holder assembly to a target on a second unit, the second unit having a second shaft, c) adjusting a horizontal and vertical position of the second unit to align a centerline of the second shaft with a center of the circle produced by the light source, d) reversing the position of the laser holder assembly on the first unit and the target on the second unit, e) rotating the second shaft on the second unit so that the laser holder assembly on the second unit projects the light source around the centerline of the second shaft, f) adjusting an angular position of the second unit to align the centerline of the second shaft with the center of the target, and optionally reducing the size of the circle produced by the light source to more precisely determine its center.

13 Claims, 4 Drawing Sheets

ALIGNMENT STRUCTURE

BACKGROUND OF THE INVENTION

1. Field of Invention

This invention relates to systems and methods for facilitating the alignment of two pieces of machinery so that the centerlines of rotating shafts of each piece are in line.

2. Description of Related Art

It is well known that two rotating machine shafts must be axially in-line to avoid misalignment. Such misalignment can lead to vibration, excessive wear, and the ultimate destruction of couplings, bearings, seals, gears and other components. For example, but not limited to, alignment structures are used to simplify. The alignment of helicopter gearboxes, driveshafts and intermediate support bearings.

Traditionally, a mechanical shaft alignment structure was used to align the centerlines of the rotating shafts. As an example, alignment of an intermediate support bearing on a helicopter drive shaft relied on a stretched wire that was mounted between the centers of the shaft flanges. However, because external forces, such as gravity and wind, affected the position of the wire, misalignment was introduced. Another problem associated with mechanical alignment structure is that if the gearboxes were mounted at an angle, it would be impossible to align the shafts and accordingly misalignment would not be detected. Moreover, the aforementioned structure failed to align the shafts' centerlines, but rather the position of the intermediate support bearings.

FIG. 1 shows the prior art associated with misalignment of gearboxes. A piano wire is stretched between the gearboxes. The stretched piano wire typically fails to show if the gearboxes are displaced laterally, vertically or angularly. Accordingly, a stretched wire structure will be difficult to accurately check for misalignment with the naked eye. Further, although the apparatus in the prior art may place the intermediate bearing on a straight line to determine the proper lateral and vertical locations, it cannot check for any angular displacement.

Because of the disadvantages associated with mechanical alignment structures, there exists a need in the art for improved shaft alignment of two pieces of machinery so that the center lines of rotating shafts of each piece are axially in-line.

SUMMARY OF THE INVENTION

Accordingly, the invention provides methods and systems for facilitating the alignment of two pieces of machinery wherein the centerlines of rotating shafts of each piece must be in-line in order to reduce vibration and wear, and prevent bearing damage.

One exemplary embodiment according to the methods and systems of the invention aligns the centerline of rotation of a first unit with the centerline of rotation of a second unit.

Other exemplary embodiments of the methods and systems of the invention separately align the shaft centerlines of the first and second unit in the horizontal and vertical planes.

Other exemplary embodiments of the methods and systems of the invention separately align the shaft centerlines of the first and second unit in the angular displacement.

Other exemplary embodiments of the methods and systems of the invention separately align the centerlines for other components, such as, but not limited to, intermediate bearings.

Other exemplary embodiments of the methods and systems of the invention provide a system that is small, light and portable that may be adaptive to other systems.

One exemplary embodiment according to the methods and systems of the invention includes a first unit, a second unit, adapters, a laser holder assembly, a target, a first shaft, and a second shaft.

In further exemplary embodiment of the methods and systems according to the invention, the adapters attach the laser holder assembly to one shaft.

In yet a further exemplary embodiment of the methods and systems according to the invention, the adapters attach the target to the other shaft.

In yet a further exemplary embodiment of the methods and systems according to the invention, the adapters may be of various designs to attach the laser holder assembly to various shaft flanges or the shaft itself.

In further exemplary embodiment of the methods and systems according to the invention, the laser holder assembly includes a laser module for producing the laser beam, a beam adjusting screw for adjusting the beam, an O-ring to secure the rear of the laser, an energy source (i.e., batteries) to generate power, a battery holder, an OFF-ON switch to control the operation, a switch attaching screw for attaching the switch to the holder, and a laser warning label.

In various exemplary embodiments of the methods and systems of the invention, the laser holder assembly projects a laser beam to provide a circle when the shaft is rotated.

In yet another exemplary embodiment of the present invention, the use of the laser allows shaft centerline alignment and angular positioning.

In yet another exemplary embodiment, the invention uses the center of the projected circle for the projected center of rotation of the shaft In various exemplary embodiments of the methods and systems of the invention, the adjustment means adjusts the size of the projected laser beam circle to the target center.

Other exemplary embodiments of the methods and systems of the invention reverse the positions of the laser holder assembly and the target on the first unit and second unit to accurately align the centerlines of the shafts and correct any angular displacement error.

These and other features and advantages of this invention are described in, or are apparent from, the following detailed description of various exemplary embodiments of the apparatuses and methods according to this invention.

BRIEF DESCRIPTION OF THE DRAWINGS

Various exemplary embodiments of the systems and methods according to this invention will be described in detail with reference to the following figures, wherein.

DETAILED DESCRIPTION OF PREFERRED EMBODIMENTS

Figure 1:
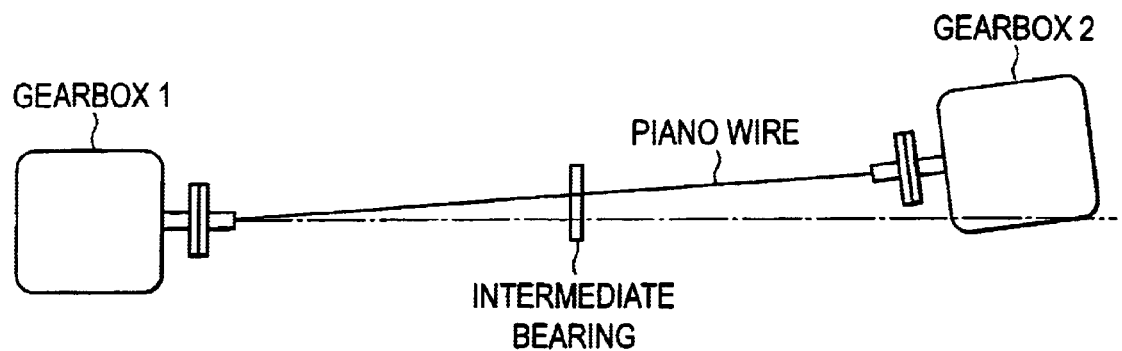
FIG. 1 shows prior art associated with misalignment of gearboxes.
Figure 2:
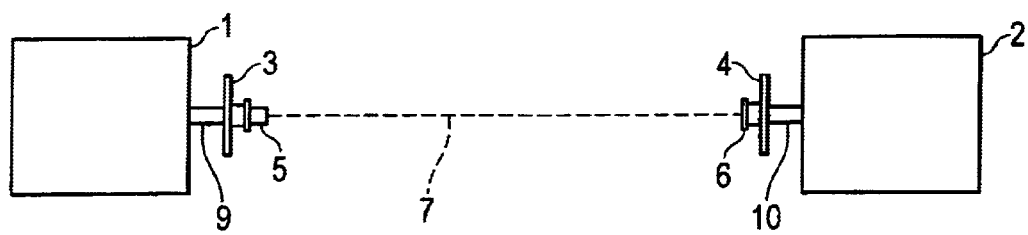
FIG. 2 is a schematic representation of an apparatus of one exemplary embodiment for aligning two pieces of machinery according to the invention.

FIG. 2 illustrates one exemplary embodiment of the system and method according to the invention. The alignment system includes a first unit 1, a second unit 2, adapters 3, 4, a laser holder assembly 5, a target 6, a laser beam 7, a first shaft 9, and a second shaft 10.

The first unit 1 includes a suitable adapter 3 attached to the first shaft 9. A laser holder assembly 5 is attached to the adapter 3. The laser holder assembly 5 has means for attaching it to various adapters, for example, but not limited to, a coarse thread arrangement. It should be appreciated that adapters of various designs may also be used to attach the laser holder assembly 5 to various shaft flanges (not shown) or the shaft itself. For example, but not limited to, for flange shafts with three bolts, (e.g., consisting of a disc with set of three slots at 120° spacing), the slots of varying widths accommodate the various size bolts and flange diameters. In the center of the disc is a raised section that is threaded to receive the laser holder assembly 5 for directing a laser beam 7. It should also be appreciated that if it is desirable to align a bearing, another adapter may be used to fit into the inside diameter of the bearing.

It should also be appreciated that other adapters that mate with other design shafts may be used, when appropriate.

The second unit 2 includes an adapter 4 attached to the second shaft 10. A target 6 is attached to the adapter 4. The target 6 is where the laser beam 7 projects the light that is visible for adjustment. As an exemplary embodiment, the target 6 is a plurality of concentric circles wherein the center of the target is coincident with the centerline of the shaft. It should be appreciated that other marks besides a circle may be used to represent the target. The target 6 can be attached to the second unit 2 using the same attaching arrangement as the laser holder assembly 5.

In various exemplary embodiments, the first unit 1 is normally fixed or more difficult to adjust than the second unit 2.

Figure 3:
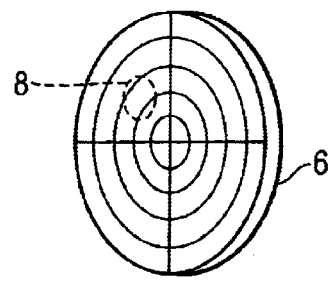
FIG. 3 illustrates a target for a laser beam according to the invention.

FIG. 3 illustrates a target 6 for a laser beam according to this invention. The target 6 is attached to shaft 10 of the second unit 2. As shown, projected on the target 6 is a circle 8, which is emitted from the light holder assembly 5 when the shaft of the first unit 1 is rotated. The position of the second unit 2 is adjusted until the center of circle 8 coincides with the center of the target 6 in order to align the second unit 2 with the first unit 1. The first unit 1 and second unit 2 are now aligned with respect to each other in the X-Y plane. However, angular error may still be present in the Z-axis. Therefore, the positions of the light holder assembly 5 and the target 6 are reversed and the process repeated. As an exemplary embodiment, the second unit 2 is adjusted in angle until the center of the projected circle 8 is coincident with the center of the target 6. Thus, the first unit 1 and the second unit 2 are now aligned in all three axes.

Figure 4:
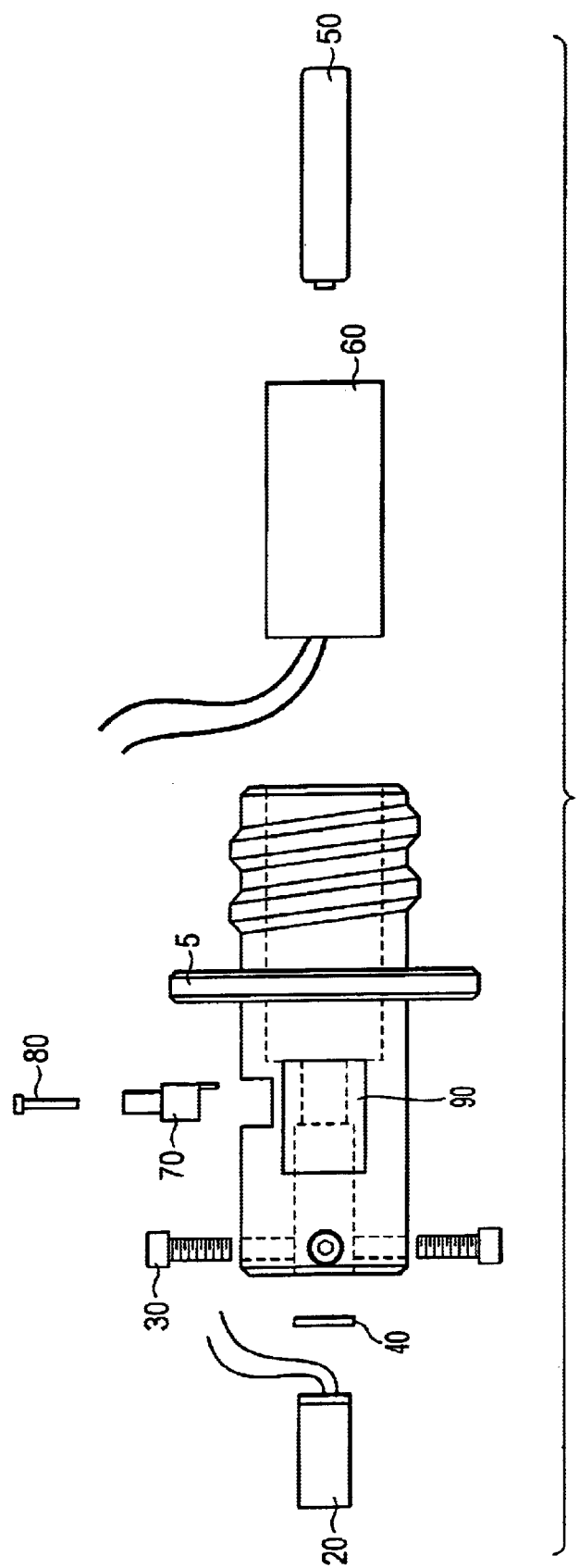
FIG. 4 is a schematic representation of a laser holder assembly in greater detail.

FIG. 4 is a representation of a laser holder assembly. As an exemplary embodiment, the laser holder assembly 5 includes a laser module 20 for producing the laser beam, a beam adjusting screw 30 for adjusting the beam, an O-ring 40 to secure the rear of the laser, which acts as a gimbal mount, an energy source 50 (i.e., batteries) to generate power, a battery holder 60, an OFF-ON switch 70 to control the operation, a switch attaching screw 80 for attaching the switch 70 to the holder 5, and a laser warning label 90.

The laser holder assembly 5 emits a laser beam 7 along a path, which, when the shaft of first unit 1 is rotated, produces a circle 8 whose center is the projected centerline of the first shaft 9. The laser beam 7 is directed to a target 6 attached on the second shaft 10 of the second unit 2. If the laser beam 7, which produces the circle 8, is larger than desired size, then the beam adjusting screws 30 are adjusted to change the size of the circle 8. The beam adjusting screws 30 reduce the size of the circle 8 to adjust to the desired size. It should be appreciated that the circle 8 may be adjusted to "zero radius", thereby producing a spot when the shaft of first unit 1 is rotated.

Figure 5:
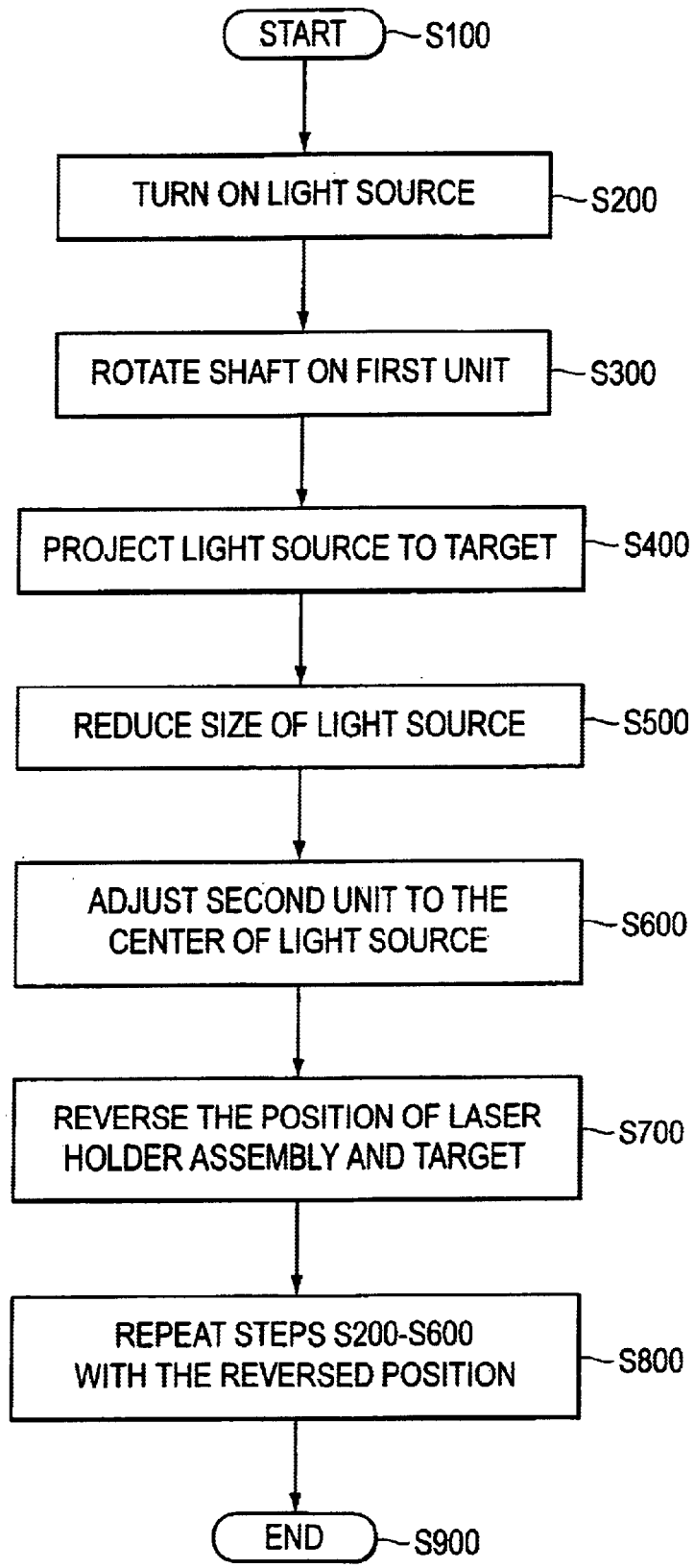
FIG. 5 is a flowchart illustrating one exemplary embodiment of the alignment process according to the invention.

FIG. 5 is a flowchart illustrating one exemplary embodiment of the alignment process according to this invention. In the exemplary embodiment shown, operation of the alignment process begins at step S100 and proceeds to step S200 where the light beam is turned on. Next, in step S300, the first shaft 9 of the first unit 1 is rotated. Imperfections in the first shaft 9 cause the light beam to project a circle 8. Then operation proceeds to step S400 to project the light beam to a target 6. This causes the projected light beam to emit a visible circle 8 on the target 6. If the diameter of the circle 8 is too large or larger than the target 6, then step S500 reduces the size of the light beam to a convenient size. Then operation proceeds to step S600 to move the second unit 2 horizontally and vertically to initially adjust the center of the circle 8 with the center of the target 6. This step provides alignment of the second unit 2 in the horizontal and vertical planes relative to the first unit. Once the center of circle 8 is coincident with the center of the target 6, step S700 reverses the positions of the laser holder assembly 5 and the target 6 on the first unit 1 and second unit 2, respectively (e.g., the laser holder assembly 5 is installed on the shaft adapter 4 of the second unit 2 and the target 6 is installed on the shaft adapter 3 of the first unit). Next, steps S200 through S600 are repeated at step S800 (i.e., the laser is turned on and the shaft on the second unit 2 is rotated and the second unit 2 is adjusted in angle to bring the center of the projected light beam circle to coincide with the center of the target on the first unit 1). By this procedure, this ensures that the centerlines of both the first unit 1 and the second unit 2 are perfectly aligned in the X-Y axis and corrects any angular displacement error in the Z-axis. The process can be repeated as necessary to obtain the desired accuracy.

It should be appreciated that a similar procedure may be used to align the intermediate bearings. With the first and second units aligned, a suitable adapter is installed in the inside diameter of the bearing. The bearing is then treated as unit 2 and the process repeated. If there exists a plurality of intermediate support bearings, the process is repeated for each bearing.

Figure 6:
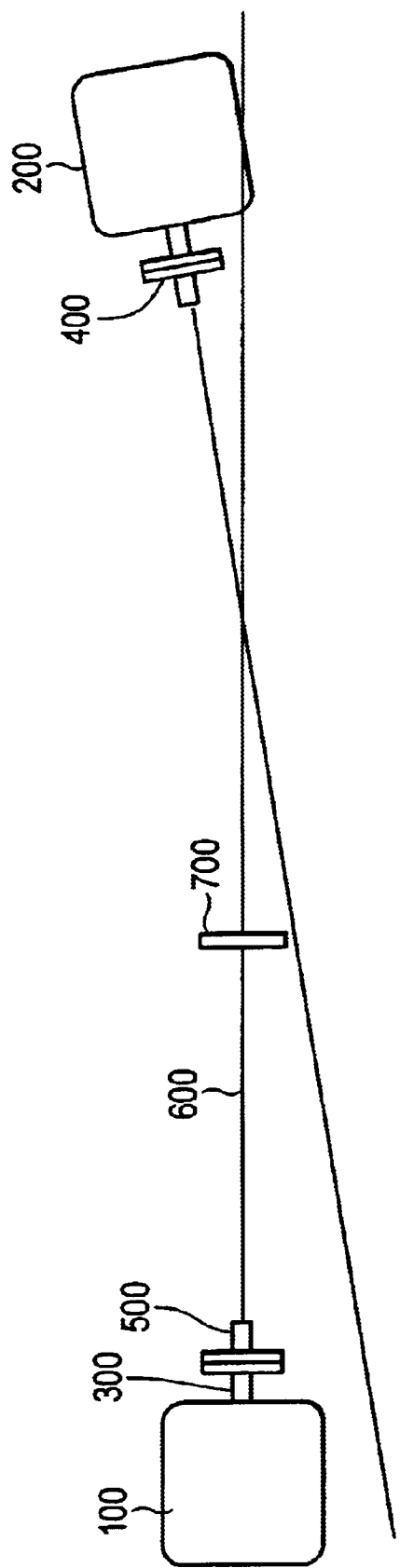
FIG. 6 is a schematic representation of an apparatus according to the invention.

FIG. 6 is a schematic representation of an apparatus according to the invention that illustrates the centerlines of the shafts being misaligned. As an exemplary embodiment, FIG. 6 shows gearboxes 100, 200, shafts 300, 400, laser holder assembly 500, laser beam 600, and intermediate bearing 700.

The laser holder assembly 500 attached to the gearbox 100 projects a laser beam 600 in the area of the gearbox 200. As shown, the projected laser beam 600 fails to coincide with the centerline of shaft 400. This provides a positive visual that the locations of the centerlines of the shafts are misaligned horizontally and vertically without using other sophisticated and complex equipment. With the centerlines being visible, it would be obvious to determine the misaligned shafts. Accordingly, the above described steps will accurately align and correct the misaligned shafts of the gearboxes.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made to the invention without departing from the spirit and scope thereof.

What is claimed is:

1. A method of aligning at least two pieces of machinery so that centerlines of rotating shafts of each piece are in-line, comprising:
   a) rotating a first shaft on a first unit, the first unit including a laser holder assembly for projecting a light source around a centerline of the first shaft;
   b) projecting the light source from the laser holder assembly to a target on a second unit, the second unit having a second shaft;
   c) adjusting a position of the second unit horizontally and vertically to align a center point of the target with a center of the circle produced by the light source;
   d) reversing the position of the laser holder assembly on the first unit and the target on the second unit;
   e) rotating the second shaft on the second unit so that the laser holder assembly on the second unit projects the light source in a circle around the centerline of the second unit to a target on the first unit; and
   f) adjusting an angular position of the second unit to align the center point of the target with the center of the circle produced by the light source emitting from the second shaft.

2. The method according to claim 1, further comprising the step of attaching an adapter on the first shaft for connecting the laser holder assembly to the first shaft.

3. The method according to claim 1, further comprising the step of attaching an adapter on the second shaft for connecting the target to the second shaft.

4. The method according to claim 1, wherein the laser holder assembly emits the light source towards the target when the first shaft is rotated.

5. The method according to claim 4, wherein the laser holder assembly emits the light source towards the target when the second shaft is rotated.

6. The method according to claim 1, wherein the laser holder assembly includes a beam adjustment screw for adjusting the size of the circle produced by the light source.

7. The method according to claim 1, wherein the projected light source is a circle wherein the first and second shafts are positioned with the circle.

8. The method according to claim 7, wherein the center of the circle is the projected centerline of the first shaft.

9. The method according to claim 7, wherein the center of the circle is the projected centerline of the second shaft.

10. The method according to claim 7, wherein the step of adjusting the position of the second unit moves until the circle coincides with a center of the target on the second shaft so as to align the first unit and second unit in a X-Y plane.

11. The method according to claim 7, wherein the step of adjusting the position of the first unit moves until the circle coincides with a center of the target on the first shaft so as to correct angular displacement errors in a Z-plane.

12. The method according to claim 1, further comprising reducing the size of the light source to a zero radius to produce a spot when the shaft of the first unit is rotated.

13. The method according to claim 1, further comprising reducing the size of the light source to a zero radius to produce a spot when the shaft of the second unit is rotated.

* * * * *